United States Patent [19]

Tsuboi et al.

[11] Patent Number: 4,862,202
[45] Date of Patent: Aug. 29, 1989

[54] MAGNIFICATION CHANGE-OVER DEVICE FOR CAMERA

[75] Inventors: Takayuki Tsuboi; Isao Nakazawa, both of Kanagawa; Yoshihiro Harunari, Tokyo; Yasuhisa Sato, Kanagawa; Yasuyuki Yamada, Tokyo, all of Japan

[73] Assignee: Canon Kabushiki Kaisha, Tokyo, Japan

[21] Appl. No.: 282,947

[22] Filed: Dec. 5, 1988

Related U.S. Application Data

[63] Continuation of Ser. No. 213,451, Jun. 29, 1988, abandoned, which is a continuation of Ser. No. 129,919, Dec. 3, 1987, abandoned, which is a continuation of Ser. No. 866,328, May 22, 1986, abandoned.

[30] Foreign Application Priority Data

May 23, 1985 [JP] Japan ............................ 60-111804
May 23, 1985 [JP] Japan ............................ 60-111805
May 23, 1985 [JP] Japan ............................ 60-111806

[51] Int. Cl.⁴ .......................... G03B 3/00; G03B 1/18
[52] U.S. Cl. ............................. 354/195.12; 354/152; 354/214

[58] Field of Search ............. 354/150, 152, 195.12, 354/214

[56] References Cited

U.S. PATENT DOCUMENTS

| 1,795,626 | 3/1931 | Watkins | 354/195.12 |
| 3,608,456 | 9/1971 | Hauser | 354/150 X |
| 3,890,626 | 6/1975 | Ettischer | 354/195.12 |
| 4,114,171 | 9/1978 | Altman | 354/152 |
| 4,350,421 | 9/1982 | Veda et al. | 354/152 |

Primary Examiner—Donald A. Griffin
Attorney, Agent, or Firm—Toren, McGeady & Associates

[57] ABSTRACT

A magnification change-over device for a camera is provided with an incident optical path for the incidence of the light of an object to be photographed; a first optical path for guiding the object light incident on the incident optical path to a first aperture; a second optical path for guiding the object light incident on the incident optical path to a second aperture; changeover means for selection between the first and second optical paths; and optical means for differentiating the magnification of an image formed through the second aperture from that of an image formed through the first aperture.

45 Claims, 8 Drawing Sheets

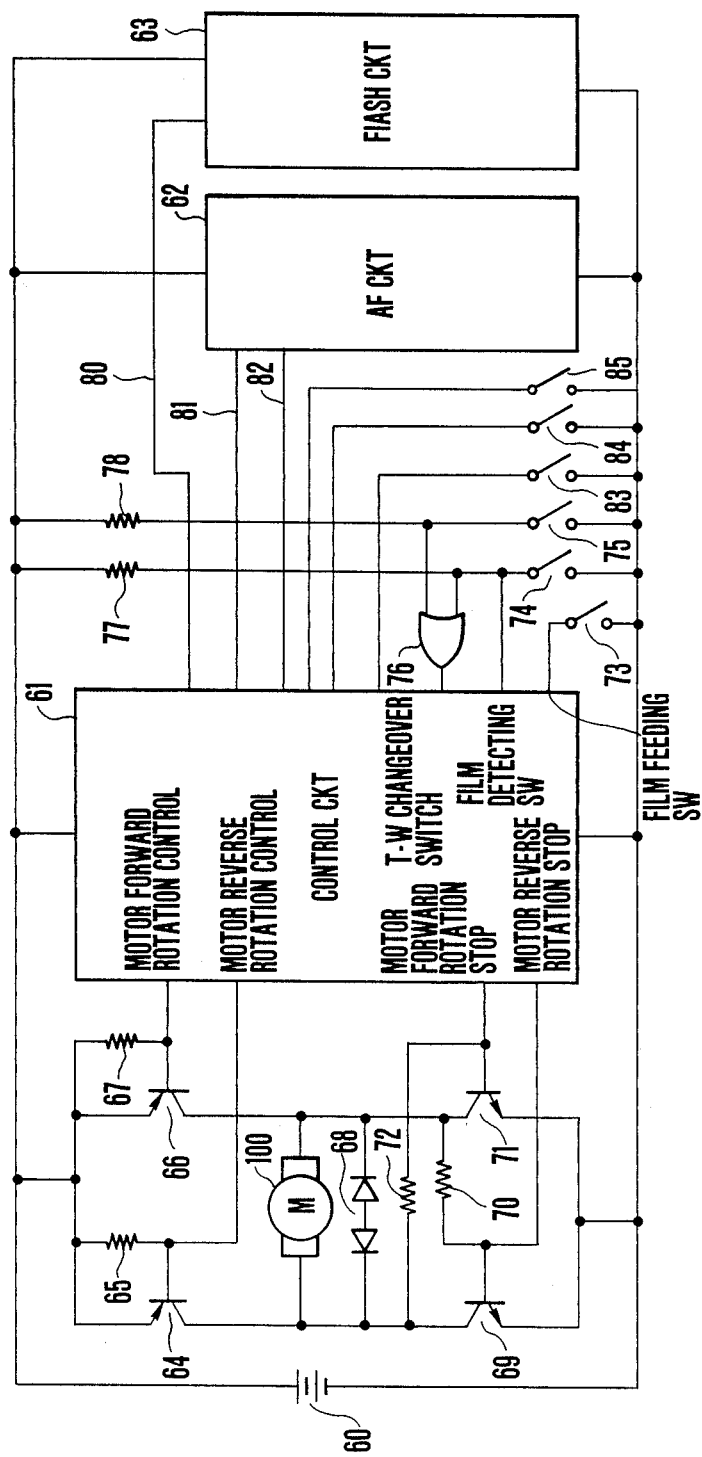
F I G. 7

MAGNIFICATION CHANGE-OVER DEVICE FOR CAMERA

This is a continuation application of Ser. No. 213,451 filed June 29, 1988 now abandoned, which in turn is a continuation of application Ser. No. 129,919 filed Dec. 3, 1987 now abandoned, which in turn is a continuation of application Ser. No. 866,328 filed May 22, 1986 now abandoned.

BACKGROUND OF THE INVENTION

1. Field of the Invention

This invention relates to a magnification changeover device for a camera and more particularly to a magnification change-over device suited to a 35 mm camera, a half-size camera and a disc camera.

2. Description of the Related Art

Generally, a camera with a magnification change-over device is known as a 2-focal-point camera. The conventional 2-focal-point camera moves the barrel part of a photo-taking lens back and forth in response to a focal length changeover operation. The conventional camera of this kind, however, has the following three problems: First, since a lens barrel unit including an automatic focusing device and a shutter control device is arranged to be movable, it has been not easy to connect these devices to applicable parts or to a power source disposed inside of the camera body. Further, since these devices must be arranged to be chargeable with the lens barrel unit both in a drawn-in position and in an extended position, the camera necessitates use of expensive connectors and a complex charging device and thus results in an increased cost.

Secondly, since the lens barrel part is to be moved in and out, the camera cannot be sufficiently waterproofed. Besides, with dust or the like sticking to the side surface of the lens barrel part while it is in an extended state, the dust would be pulled into the inside of the camera when the lens barrel part is drawn in. In that event, the operation of the camera would be affected by the dust. Further, many inner and outer parts overlap each other when the lens barrel is drawn inward into a wide-angle state (hereinafter referred to as WIDE). Therefore, this results in an excessively large camera because of the arrangement extended for blocking ambient light when the lens is drawn out and for blocking the light after completion of the operation of a shutter unit arranged at an aperture.

Thirdly, the position of the lens shifts to a great extent for change-over between a telephoto state (hereinafter referred to as TELE) and WIDE. However, the lens barrel must be arranged to shift the lens position with a high degree of precision. The lens barrel, therefore, must be carried by extremely precise arrangement and parts. This requirement also results in an increase in cost and size of the camera.

SUMMARY OF THE INVENTION

Such being the problems of the prior art, it is a general object of this invention to provide a magnification change-over device for a photographic camera which is capable of solving these problems.

It is a more specific object of this invention to provide a simple and compact magnification changeover device for a camera which is provided with an incident optical path for the incidence of the light of an object to be photographed; a first optical path for guiding the object light incident on the incident optical path to a first aperture; a second optical path for guiding the object light incident on the incident optical path to a second aperture; change-over means for selection between the first and second optical paths; and optical means for differentiating the magnification of an image formed through the second aperture from that of an image formed through the first aperture.

It is another specific object of this invention to provide a magnification change-over device for a camera wherein, the device of the above-stated object is further provided with motor drive means which, in response to the selecting operation of the change-over means, operates to shift the positions of optical system, the film, etc. and discriminating means which discriminates between the presence and absence of the film; and, in case that the absence of the film is detected by the discriminating means, the motor drive means is inhibited from shifting the positions of the optical system, the film, etc., so that the electric energy of a power source battery can be saved from being wasted.

These and further objects and features of this invention will become apparent from the following detailed description of embodiments thereof taken in connection with the accompanying drawings.

BRIEF DESCRIPTION OF THE DRAWINGS

FIG. 3 shows it as in an initial state after change-over to the TELE position. FIG. 4 shows it as in a final state obtained after the change-over to the TELE position. FIG. 5 shows it as in a state of being shifted to a WIDE position.

FIG. 6(*b*) is a detailed view showing the same optical system of FIG. 6(*a*) as in a state of having been shifted to a TELE position.

FIG. 7 is a circuit diagram showing the driving circuit of the device shown in FIGS. 1 and 2.

FIG. 8(*b*) shows the same mechanism as in a state of having been shifted to a WIDE position.

DETAILED DESCRIPTION OF THE PREFERRED EMBODIMENTS

An embodiment of this invention is arranged as described below with reference to the accompanying drawings.

Figure 1:
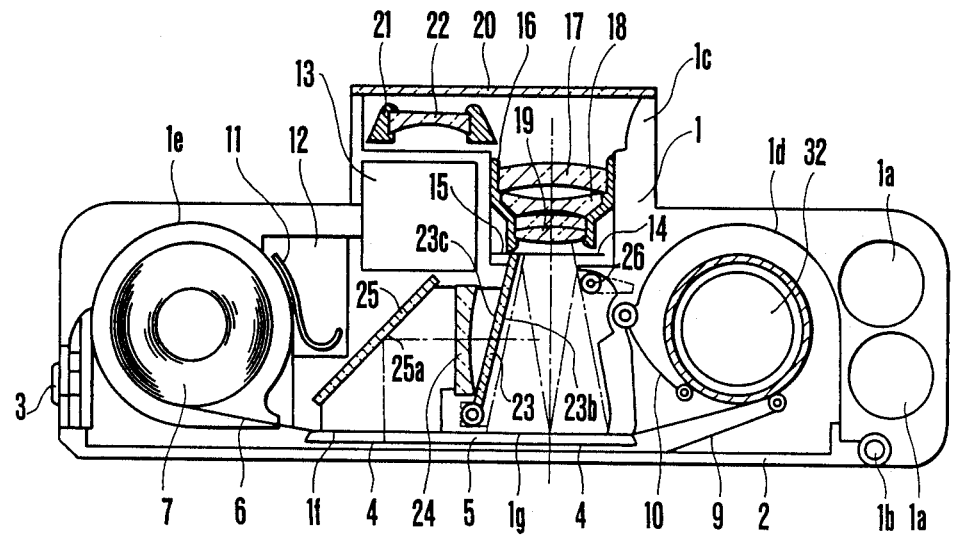
FIG. 1 is an illustration of the whole arrangement of a magnification change-over device for a camera arranged according to this invention as an embodiment thereof.
Figure 2:
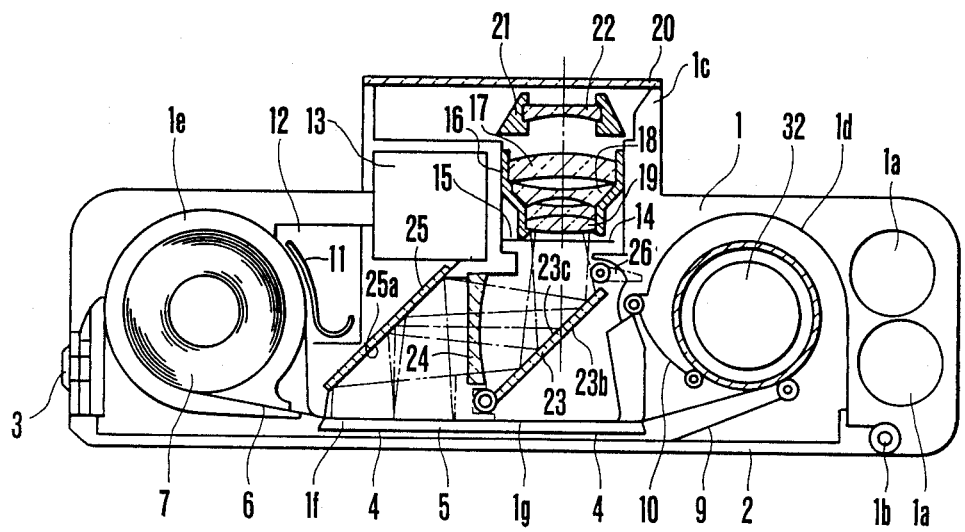
FIG. 2 is an illustration of the same device showing it as in a state of having been shifted to a TELE position.

FIGS. 1 and 2 show the whole of the device embodying this invention, FIG. 1 showing the device as in a WIDE position and FIG. 2 as in a TELE position. These illustrations include a camera body 1 and a back lid 2. The camera body 1 comprises a battery chamber 1*a*; a hinge shaft 1*b*; a lens barrel part 1*c* for a phototaking optical system; a spool chamber 1*d*; a film cartridge chamber 1*e*; and two aperture parts 1*f* and 1*g*. The hinge shaft 1*b* is fitted into a shaft bearing hole provided in the back lid 2 to permit the back lid 2 to be turnable on the shaft. A back lid opening and closing knob 3 is provided on the opening side of the back lid 2. The back lid 2 is thus arranged to be opened and closed by means of this knob 3. A spring 4 and a pressing plate 5 are arranged to form a given tunnel space between the pressing plate 5 and the aperture parts 1f and 1g. A film 6 is thus arranged to be movable through this tunnel space. A film cartridge 7 has the shaft part thereof engage a fork which is not shown but is arranged to be responsive to a film rewinding device. The fore end part of the film 6 is wound around a spool 32 which is interlocked with a film winding device. The embodiment is provided with rollers 9 and 10; a DX code detecting contact piece 11; a DX code detecting circuit 12; and an automatic focusing device 13 in combination with a shutter control device. The illustrations further include shutter blades 14 and 15, and convex lens units 17, 18 and 19 which are housed within a lens barrel 16. The lens barrel 16 is shown in FIG. 1 in an infinity distance position obtained by drawing it inward, to a maximum extend, by means of the automatic focusing device 13. A protection glass piece 20 is formed in one body with the camera body 1 and is arranged to protect the camera from water and dust. An auxiliary lens unit 21 includes a concave lens 22 and is arranged to be shiftable between the positions thereof shown in FIGS. 1 and 2 in response to a TELE-WIDE change-over operation member which is not shown but is provided on the outside of the camera. When the auxiliary lens unit 21 is in the TELE position, the frame thereof serves to block light from obliquely coming onto the film without passing through mirrors 23 and 25. The lens unit 21 is provided with a protruding part 21a and two end parts 21b and 21c.

A movable mirror 23 is pivotally carried and is provided with a reflection preventing coating part 23b and a vapor deposited mirror part 23c. Under the WIDE condition as shown in FIG. 1, an optical path on the TELE side is blocked by the reflection preventing coating part 23b and the light is guided to the aperture 1g which is disposed on the WIDE side. Further, under the TELE condition as shown in FIG. 2, the vapor deposited mirror part 23c blocks an optical path on the WIDE side and the light is guided to the other aperture 1f which is disposed on the TELE side.

A concave lens 24 is secured to the camera body 1 and is disposed within an optical path which is arranged to be used solely under the TELE condition. In the case of the TELE condition, the concave lens 24 acts in conjunction with the concave lens 22 which enters the optical path to lower the power of the convex lens units 17, 18 and 19. This shifts the focal point backward to have an image of the object formed with a greater magnification than under the WIDE condition.

Figure 3:
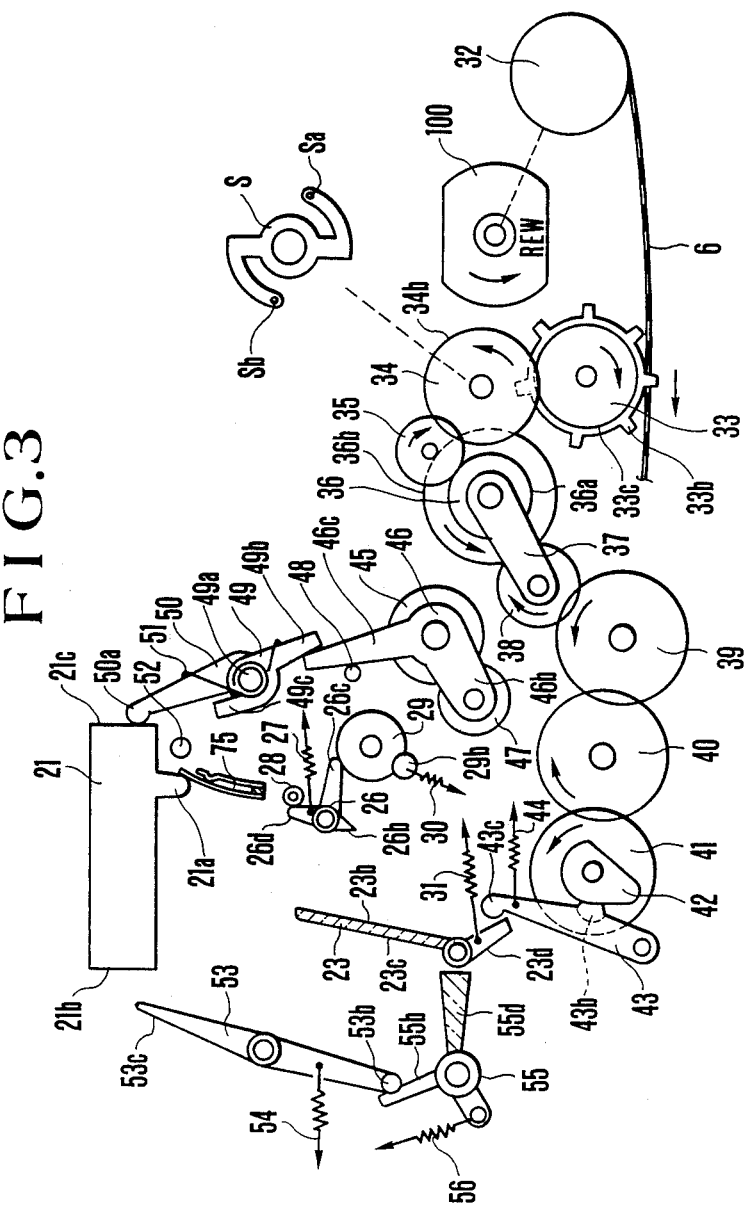
FIGS. 3, 4 and 5 show a driving mechanism for a change-over optical system shown in FIGS. 1 and 2.

A fixed mirror 25 is secured to the camera body 1 and is provided with a mirror surface 25a. In conjunction with the above-stated movable mirror 23, the fixed mirror 25 forms a photo-taking optical axis perpendicular to the surface of the film 6. A movable mirror lock pawl 26 is pivotally carried as shown in FIG. 3 and is arranged to lock the movable mirror 23 by means of its claw part 26b. The precision of the reflection optical system is improved with the pawl 26 arranged to directly engage one side of the movable mirror 23. The pawl 26 is urged to turn clockwise by a spring 27. However, the pawl 26 is kept in the position of FIG. 3 with an arm 26d abutting on an adjustment pin 28 which is adjustable during an assembly process. The position of the claw part 26b of the pawl 26 changes, accordingly as the adjustment pin 28 is turned around. With the movable mirror 23 in the TELE position thereof, the angle of the mirror 23 relative to the optical path of FIG. 2 is finely adjustable by turning the adjustment pin 28. The movable mirror lock pawl 26 is provided with another arm part 26c. Meanwhile, a release gear 29 which is pivotally carried is provided with a release pin 29b. The lock pawl 26 is thus arranged to be released from the locking position thereof when the arm 26c is pushed upward by the release pin 29b of the release gear 29.

Figure 4:
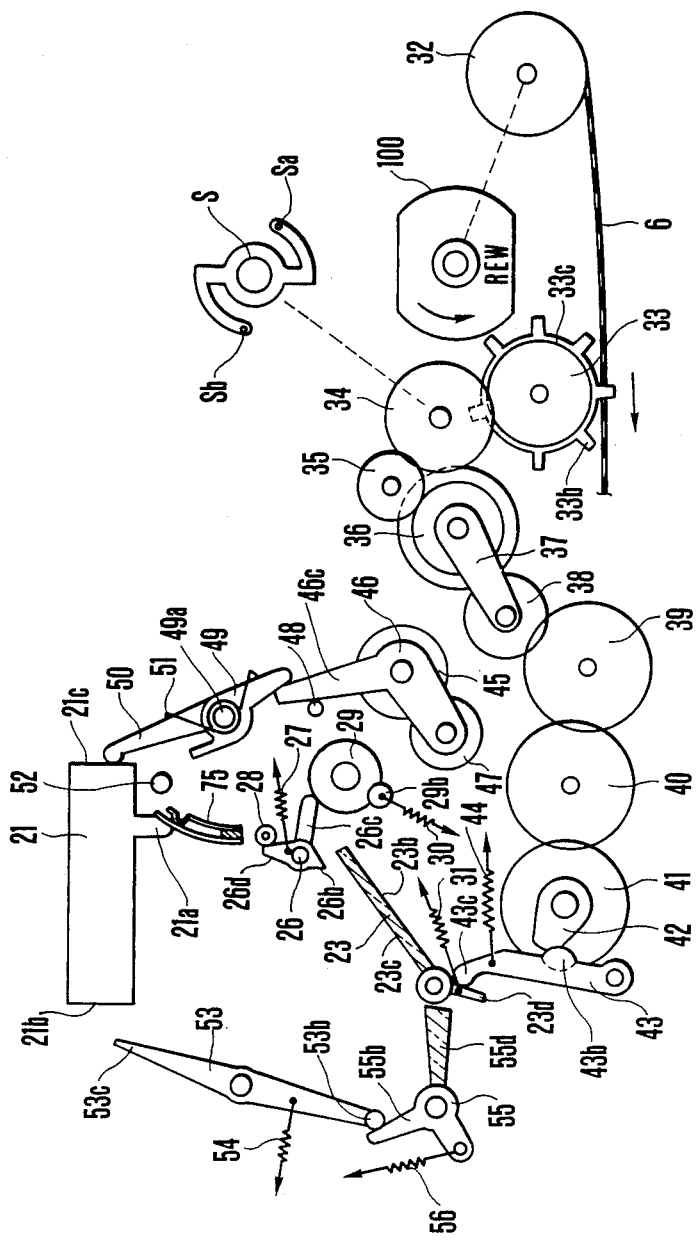

The movable mirror 23 is provided with an arm 23d. The fore end part 43c of a lever 43 is arranged to abut on the arm 23d and to pivot the movable mirror 23 clockwise against the force of a spring 31 when the camera is shifted to the TELE position as shown in FIGS. 2 or 4. A motor 100 is rotatable both clockwise and counterclockwise. When the motor 100 rotates clockwise as viewed on the drawing, the film 6 is moved to the right as viewed the drawing as the spool 32 is turned round counterclockwise via a known gear train and a known planetary gear clutch. When the motor 100 rotates counterclockwise, the film 6 is taken up into the film cartridge according as a fork which is not shown is rotated clockwise via a known gear train and a known planetary gear clutch.

A sprocket 33 is rotatably carried and has a toothed part 33b which is arranged to engage the perforations of the film 6 and a gear part 33c which engages the gear part 34b of a gear 34. When the film 6 moves, the sprocket 33 rotates either clockwise or counterclockwise. The rotation of the sprocket 33 is transmitted to gears 34 and 35. A contact piece S is formed in one unified body with the gear 34. The contact piece S is provided with terminals Sa and Sb which are arranged to slide over a pulse plate (not shown) and thus forms a switch 73 as shown in a circuit diagram which will be described later herein. The contact pieces are thus arranged to detect the movement and the moving extent of the film 6.

A double gear 36 is rotatably carried. The small gear part 36a of the gear 36 engages the above-stated gear 35. The large gear part 36b of the gear 36 engages a gear 38. A lever 37 is rotatably and coaxially arranged together with the gear 36. The above-stated gear 38 is fittingly engaged with the fore end of the lever 37 with a suitable degree of friction. They thus jointly form a planetary gear arrangement. The planetary gear 38 is arranged to engage a gear 39 when the sprocket 33 turns clockwise to rewind the film as shown in FIG. 3 and to engage a gear 45 when the sprocket 33 turns round counterclockwise. The gear 39 is arranged to rotate only when the sprocket 33 rotates clockwise as mentioned above. The rotation of the gear 39 is transmitted to gears 40 and 41. The gear 41 then rotates counterclockwise.

The gear 41 is provided with a charge cam 42 which is formed in one body with the gear 41. The force of a spring 44 causes the charge pin 43b of the charge lever 43 to engage the charge cam 42. The charge lever 43 is pivotally carried and is arranged to have its fore end part 43c engage the arm 23d of the above-stated movable mirror 23. When the gear 41 is rotated counterclockwise, the charge cam 42 causes the charge lever 43 to turn round counterclockwise. This in turn causes the movable mirror 23 to pivot clockwise thus bringing the mirror 23 to its position as shown in FIG. 4 by virtue of the lift of the charge cam 42 arranged for that purpose.

A gear 45 is coaxially arranged together with a lever 46. One end 46b of the lever 46 carries, with a suitable degree of friction, another gear 47 which engages the gear 45. These parts thus form a planetary gear arrangement. The lever 46 is provided with an arm part 46c which is formed at the other end of the lever.

When the sprocket 33 turns counterclockwise under the condition of FIG. 3, the above-stated planetary gear 38 turns counterclockwise and the lever 37 turn clockwise. This causes the planetary gear 38 to engage the gear 45. As a result, the gear 45 turns clockwise and urges the lever 46 to turn clockwise as viewed on the drawing. However, since the arm 46c of the lever is abutting the arm 49b of a lever 49, the lever 46 remains in the position of FIG. 3.

Figure 5:
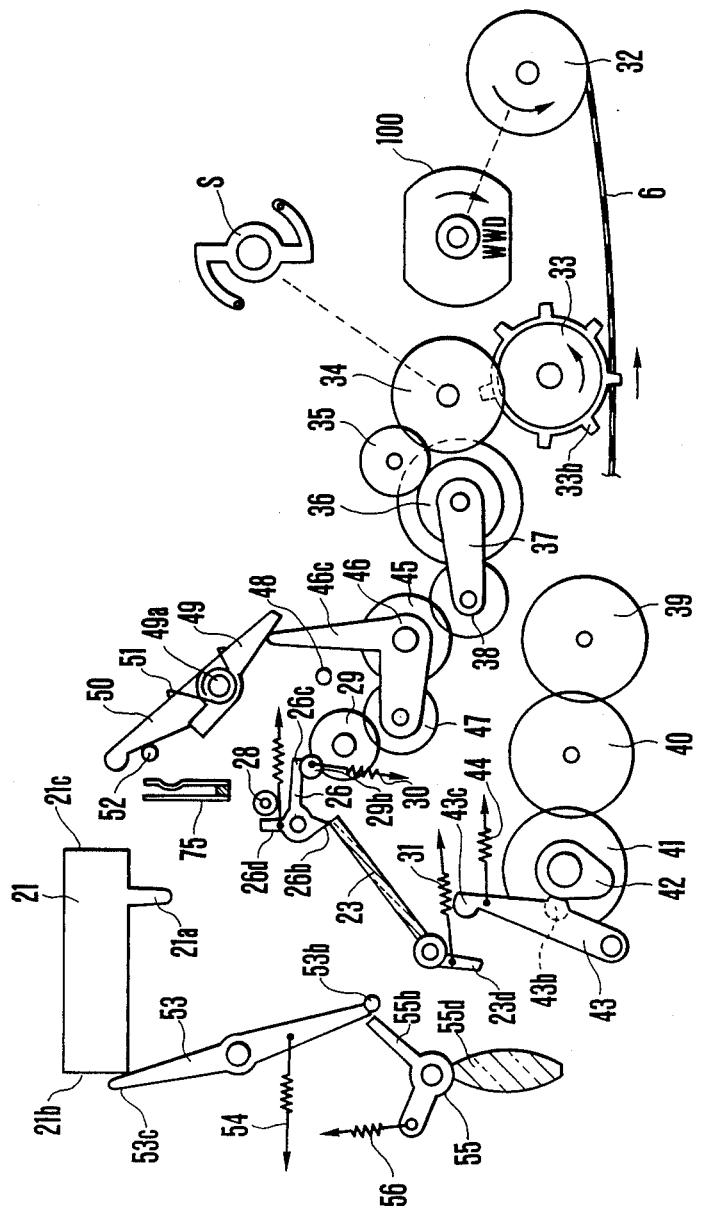

Referring to FIG. 5, when the lever 49 is released from pressure with the end part 21c of the frame 21 moved to the left, the counterclockwise rotation of the sprocket 33 causes the gear 38 to engage the gear 45 thereby causing the gear 45 to turn clockwise. This in turn causes the lever 46 to turn clockwise. The planet gear 47 then engages the release gear 29 causing the gear 29 to rotate clockwise. The clockwise rotation of the release gear 29 pushes up the arm 26c of the movable mirror lock pawl 26 with the release pin 29b thereof. This disengages the claw 26b from the movable mirror 23 to allow the movable mirror 23 to be brought back to the position of FIGS. 3 or 1 by the force of the spring 31.

The levers 49 and 50 are fitted on the same shaft 49a. A spring 51 is arranged to urge the lever 49 to turn clockwise relative to the lever 50 and to urge the lever 50 to turn counterclockwise relative to the lever 49. With the end part 21c of the frame 21 having moved away as shown in FIG. 5, the arm part 49c of the lever 49 engages the lever 50. When the frame 21 assumes the TELE state as shown in FIGS. 3 and 4, the end part 21c pushes the fore end part 50a of the lever 50. This causes these levers 50 and 49 to turn clockwise. The arm part 49b then abuts a stopper 48 and the frame 21 comes to a stop in the TELE state with the stopper 48 being somewhat pushed by the arm part 46c. As a result, the arm part 49c, which serves as an engaging part between the levers 50 and 49 assumes a state of being slightly separated from the lever 50. In other words, the strokes of the frame 21 and the lever 46 are arranged to be absorbed by the levers 49 and 50 and the spring 51.

A stopper 52 is arranged to bring the above-stated levers 49 and 50 to a stop. A lever 53, which is arranged to be turnable, is urged to turn clockwise by a strong force of a spring 54. The lever 53 is provided with a pin 53b which abuts the arm part 55b of a view finder change-over lever 55. In the case of FIG. 3, the spring 54 thus urges the view finder change-over lens 55d of the lever 55 to move counterclockwise as viewed in the drawing. The lens 55d is thus displaced to the position of a stopper 59 as shown in FIG. 6. Another arm 53c of the lever 53 is arranged to be pushed by the end part 21b of the frame 21 when the frame 21 is shifted to the WIDE position thereof. In this instance, with the arm part 53c thus pushed, the lever 53 turns counterclockwise to relieve the view finder change-over lens 55d from the pushing force exerted thereon by the lever 53.

Figure 6B:
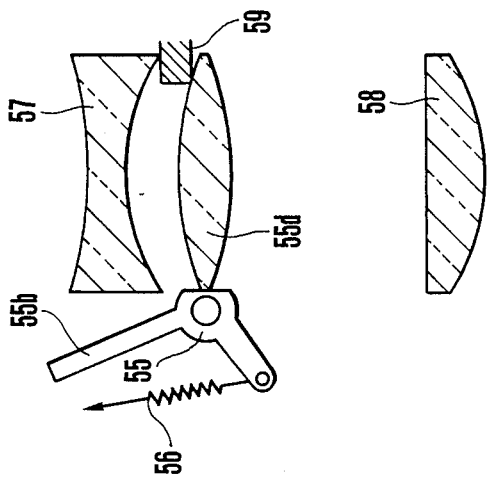
FIG. 6(*a*) is a detailed view of a view finder optical system shown in FIGS. 3, 4 and 5.
Figure 6A:
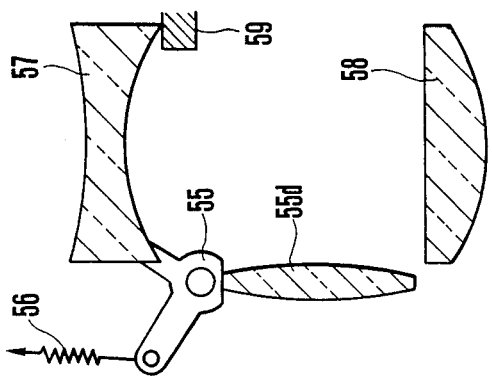

The view finder change-over lever 55 is under a weak urging force of a spring 56 which is exerted in the clockwise direction. When the camera is in the WIDE state as shown in FIG. 5, the pin 53b of the lever 53 moves away from the arm part 55b of the view finder change-over lever as mentioned in the above. In this instance, therefore, the lens 55d is located outside of the view finder optical path as shown in FIG. 6(a). When the camera is shifted to the TELE state as shown in FIG. 3, the pin 53b of the lever 53 is caused by the strong urging force of the spring 54 to push the arm part 55b of the view finder change-over lever 55. In that instance, therefore, the lens 55d is inserted into the view finder optical path as shown in FIG. 6(b). The illustration includes an objective lens 57 and an eyepiece 58.

FIG. 7 shows the circuit arrangement of the device shown in FIGS. 1 and 2. The illustration in FIG. 7 includes a power supply 60; a known control circuit 61 which controls film winding and rewinding and the operation of a shutter; an AF circuit 62 which controls the focusing operation of the camera; and a flash circuit 63.

Bridge circuits 64 to 72 are arranged to control the forward and reverse rotations of the motor 100. Transistors 64 and 71 are arranged to have currents flow between their emitters and collectors for film winding during the forward rotation of the motor 100. Transistors 66 and 69 are arranged to have currents flowing thereto for film rewinding during the reverse rotation of the motor. The bases of these transistors are connected to the terminals of the control circuit 61 including a motor forward rotation control terminal; a motor reverse rotation stop terminal; a motor reverse rotation control terminal; and a motor forward rotation stop terminal. These transistors are thus arranged to be turned on and off under the control of the control circuit 61. Resistors 65, 67, 70 and 72 are arranged to lower voltages. A Zener diode 68 is arranged to absorb a back electromotive force at the time of bringing the motor 100 to a stop. A film feeding switch 73 is formed by the contact piece S formed in one unified body with the gear 34 which is arranged to be rotated by the sprocket 33 as mentioned in the foregoing. The switch 73 is used for detecting the extent to which the film is fed or rewound with the contact piece S sliding over a panel plate which is not shown and by turning on and off the connection between the ground GND and the film feeding SW terminal of the control circuit 61 in accordance with a known method. A switch 74 is arranged to detect the presence or absence of a film in a known manner. The switch 74 turns on when the camera is loaded with a film. Then, the potential of the film presence or absence SW terminal of the control circuit 61 drops to inform the circuit 61 of the presence of the film within the camera. A reference numeral 75 denotes the T-W (TELE-WIDE) change-over switch shown in FIGS. 3, 4 and 5. When the frame 21 is shifted to the TELE position thereof in response to a change-over operation performed on the external operation member, the T-W change-over switch 75 is turned on by the protruding part 21a as shown in FIG. 3. When the frame 21 is shifted to the WIDE position thereof, the protruding part 21a turns off the switch 75 as shown in FIG. 5. The control circuit 61 is arranged to detect the operated state of this switch 75. The on-off signal of the switch 75 is not directly supplied to the control circuit 61. When both switches 74 and 75 are ON, both the input signals coming to an OR gate 76 are at low levels. At the control circuit 61, the input level of the T-W change-over terminal becomes low only on that occasion to indicate that the camera is in the TELE state. Resistors 77 and 78 are provided for lowering voltages. The circuit diagram of FIG. 7 includes a shutter synchronizing trigger signal line 80; signal lines 81 and 82 which are provided for exchange of signals between the control circuit 61 and the AF circuit 62; a back lid opening and closing switch 83 which is arranged to change from an ON state to an OFF state when the back lid of the camera is closed and to cause blank feeding of the film to be performed by detecting a rise of the terminal level of the control circuit 61 from a low level to a high level; a counter switch 84 which is arranged to change from an ON state to an OFF state when a film display counter comes to a position for "1" and thus to bring the film blank feeding operation to a stop; and a release switch 85 which is closed in response to the depression of a release button. The circuit arrangement of the embodiment operates as described below:

When the camera is not loaded with any film, the embodiment operates as follows: Since the film presence-or-absence detecting switch 74 is in an OFF state in this instance, both the film presence-or-absence SW terminal and the T-W changeover SW terminal of the control circuit 61 are at high levels. This informs the control circuit 61 of the absence of the film within the camera. When the back lid is closed and the shutter release button is pushed under this condition, that is, when the switch 83 is open and the switch 85 is closed a known focusing device, a known shutter device and a known winding device (When the film presence or absence switch 74 is closed, a timer included in the control circuit 61 detects a predetermined time longer than the time required for winding one frame of film, thereby stopping the winding.) operate one after another in the same manner as in the conventional camera. When the photographer operates a TELE-WIDE change-over operation member 21 which is not shown, the frame 21 for example, respectively shifts from the position of FIG. 1 to the position of FIG. 2 or from the position of FIG. 5 to that of FIG. 3. With the position of the frame 21 fixed either in the position of FIG. 2 or in the position of FIG. 3 by means of a click member or device which is not shown, the view finder change-over lens 55d is inserted into the view finder optical path via the lever 53 in accordance with the movement of the frame 21. This enables the photographer to see the object at a higher degree of magnification. In this instance, since the film presence-or-absence switch 74 is OFF, the output of the OR gate 76 remains unchanged even when the T-W change-over switch 75 operates. Therefore, no current is supplied to the motor 100. The movable mirror 23 of the photo-taking optical system of the camera remains inoperative. There takes place no film movement.

When the photographer pushes the release button under this condition, the camera performs a sequence of photographic actions as mentioned above and then comes back to its original condition.

Next, when the TELE-WIDE change-over operation member is again operated to bring the frame 21 from the position of FIG. 2 back to the position of FIG. 1, the frame 21 is set in the position of FIG. 1 by means of the click device which is not shown. Then, the lever 53 moves from the position of FIG. 3 to that of FIG. 5. Therefore, the view finder change-over lens 55d shifts from the position of FIG. 6(b) to the position of FIG. 6(a). As a result, the photographer sees the object at a lower degree of magnification. However, in the same manner as in the above-stated case, the control circuit 61 is unable to detect any change of the switch 74 from an ON state to an OFF state. Accordingly, no power supply is effected and the movable mirror 23 is in repose. If the photographer again pushes the release button under this condition, the camera performs the sequence of photographic actions and again comes back to the original condition thereof as mentioned above.

With the camera not loaded with the film, it is thus only the positions of the frame 21 and the view finder that are shiftable while the mirror is not shifted by motor 100. This saves the electric energy from being wasted. Meanwhile, since the magnification of the view finder is shifted from one value to another, the photographer can check the operation of the camera without wasting energy.

When the camera is loaded with the film, the embodiment operates as follows: With the film 6 inserted into the camera, when the back lid is closed, the switch 83 changes from an ON state to an OFF state. Then, to accomplish the known blank film feeding operation, the control circuit 61 causes the motor 100 to rotate forward as shown in FIG. 5 by changing the level of the base terminals of the transistors 66 and 69 from a high level to a low level. The motor 100 is thus rotated forward. Then, the spool 32 is rotated counterclockwise to take up thereon a prescribed number of frame portions of film 6 required for blank feeding. A known counter switch 84, which is not shown, changes from an ON state to an OFF state when the prescribed number of film frame portions have been taken up. With the switch 84 thus turned off, the level of the base terminals of the transistors 66 and 69 becomes high. At the same time, the level of the base terminals of the transistors 64 and 71 is changed to a low level to apply an inverse current supply to the motor 100. By this, an electrical braking action is applied to the motor 100 to quickly bring the motor to a stop.

Following this, the control circuit 61 detects the input level of the T-W change-over SW terminal. Then, the film presence-or-absence switch 74 has already been turned on to make the input level of one input terminal of the OR gate 76 low. Therefore, if the T-W changeover switch 75 is in an ON state, the control circuit 61 detects a low level input at the T-W change-over SW terminal thereof. The control circuit 61 then causes the level of the base terminals of the transistors 64 and 71 to become low. This causes motor 100 to reversely rotate. A planet clutch device which is not shown, is shifted to transmit the rotating force of the motor 100 from the spool 32 to a fork, which is not shown. The film 6 begins to be rewound. The embodiment assumes the state of FIG. 3.

When the film 6 begins to move to the left from the state of FIG. 3, the sprocket 33 rotates clockwise as viewed in the drawing. The film feeding switch 73 turns on and off, accordingly as the contact piece S makes sliding movement. By this, the moving extent of the film is added up within the control circuit 61. The planetary lever 37 is turned counterclockwise to engage the gear 38 with the gear 39. The charge cam 42 is turned counterclockwise. The fore end part 43c of the lever 43 then pivots the movable mirror 23 in the clockwise direction against the force of the spring 31. The embodiment then assumes the state of FIG. 4.

When the photo-taking position of the film 6 reaches the aperture 1f shown in FIG. 2 with the film further rewound, the on-off signal of the film feeding switch 73 reaches a prescribed value required for the TELE-WIDE changeover. In response to this, the control circuit 61 makes the level of the base terminals of the transistors 64 and 71 high and, at the same time, makes the level of the base terminals of the transistors 66 and 69 low. By this, electric braking is applied to promptly bring the motor 100 to a stop with a forward rotating current supplied to the motor just for a predetermined period of time. There obtains the state of FIG. 2. The camera thus becomes ready for a photo-taking operation. In this specific embodiment, the charge cam 42 is arranged to make approximately one turn during the above-stated process.

Meanwhile, the camera is in the WIDE state when the blank feeding of the film has been completed. Then, if the switch 74 is in an OFF state, the film presence-or-absence switch 74 is in an ON state. However, since the T-W change-over switch 75 is in an OFF state, the OR gate 76 keeps the T-W change-over terminal of the control circuit 61 at a high level. Therefore, preparation for a photo-taking operation is completed upon completion of the blank feeding of film.

When the camera is operated for photographing under this condition, the control circuit 61 causes the motor 100 again to make forward rotation in the same manner as described in the foregoing after completion of the focusing operation and the shutter operation.

In case the case where the camera is in the TELE state as shown in FIG. 4, the motor 100 makes forward rotation and the force of rotation is transmitted by a film winding device to the spool 32. The spool turns counterclockwise to take up the film 6. Then, the sprocket 33 rotates counterclockwise. The contact pieces S slides. The film feeding switch 73 turns on and off to enable the control circuit 61 to count the moving extent of the film 6. At the same time, the planet lever 37 turns clockwise to cause the gears 38 and 45 to engage each other. The gear 45 rotates clockwise. The lever 46 is thus urged to turn clockwise by the gear 45. However, the clockwise turn of the lever 46 is prevented by the levers 50 and 49 as the frame 21 has been shifted to the right as viewed on the drawing. Therefore, the lever 46 remains in the state as shown in FIG. 3.

Following this, when a predetermined amount of the on-off signal produced by the film feeding switch 73 is counted by the control circuit 61, electric braking is applied to the motor 100 in the above-stated manner. The motor comes to a stop and a winding action of one frame portion of film comes to an end.

Next, when the camera is in the WIDE state as shown in FIG. 1, the embodiment operates as follows: After completion of a sequence of focusing and shutter operating processes, the control circuit 61 causes the motor 100 to make a forward rotation. The film 6 is wound up on the spool 32. The sprocket 33 rotates counterclockwise. The on-off signal of the film feeding switch 73 is supplied to the control circuit 61. The lever 37 turns clockwise. The gears 38 and 45 engage each other. The gear 45 rotates clockwise. Therefore, as shown in FIG. 5, the lever 46 turns clockwise to cause the gear 47 to engage the release gear 29. The gear 29 rotates clockwise.

Then, the release pin 29 pushes the arm 26c of the movable mirror lock pawl 26 to cause the pawl 26 to turn counterclockwise as shown in FIG. 5. A release action is thus performed on the movable mirror 23. However, since the mirror 23 is in the position as shown in FIG. 1, it remains unmoved. After that, when a predetermined amount of the on-off signal of the film feeding switch 73 is received by the control circuit 61, electric braking is applied to the motor 100 to bring it to a stop in the same manner as described in the foregoing. The one frame portion winding operation on the film comes to an end and the camera becomes ready for a photo-taking operation.

In this specific embodiment, the release gear 29 is arranged to make just two turns during one performance of the film winding operation.

With the camera loaded with the film, the camera makes change-over between the TELE and WIDE states as follows: In the case where the photographer operates the external operation member to shift it to the TELE position thereof, the frame 21 and the view finder change-over lens 55d are shifted to their positions as shown in FIG. 3. The T-W change-over switch 75 is turned on. Accordingly, the input level of the T-W change-over SW terminal of the control circuit 61 becomes low. The control circuit 61 causes the motor 100 to make reverse rotation in the same manner as mentioned in the foregoing. The reverse rotation of the motor 100 causes a planetary clutch, which is not shown, to shift its position to the film rewinding side within a known wind up device. A fork, which is not shown, rotates to move the film 6 to the left as viewed in the drawing. This causes the sprocket 33 to rotate clockwise. The contact piece 35 then supplies the control circuit 61 with the on-off signal of the film feeding switch 73 representing the moving extent of the film 6. Concurrently around, the lever 37 turns round counterclockwise to its position as shown in FIG. 3 to cause the gears 38 and 39 to engage each other. The charge cam 42 rotates clockwise. The charge lever 43 then pivots the movable mirror 23 in the clockwise direction. This results in the state of FIG. 4. Then, with the charge cam 42 rotating further clockwise, when the on-off signal of the film feeding switch 73 reaches a predetermined amount required for the TELE changeover and a photographing portion of the film 6 comes to the aperture 1f, the motor 100 is brought to a stop by electric braking applied thereto in the above-stated manner. Then, there obtains the state of FIG. 2. The charge cam 42 is arranged to make just one turn during the above-stated operation. The photo-taking operation which follows this is performed in the same manner as described in the foregoing after the description of the blank film feeding operation and therefore does not require further description.

Next, a change-over operation from the TELE state to the WIDE state is as follows: When the external operation member is shifted from the state of FIG. 2 to the WIDE position thereof, the frame 21c shifts to the left. The lever 53 retracts the view finder change-over lens 55d away from the view finder optical path as shown in FIG. 5. The switch 74 turns off. The input level of the T-W change-over terminal of the control circuit 61 becomes high. The control circuit 61 detects this. The motor 100 is caused to make forward rotation in the same manner as described in the foregoing. The forward rotation of the motor 100 causes a film winding device which is not shown to turn the spool 32 counterclockwise. The film 6 moves to the right. The sprocket 33 rotates counterclockwise. The on-off signal of the film feeding switch 73 is generated to represent the moving extent of the film. The lever 37 is turned clockwise. The gears 38 and 45 engage each other. The lever 46 is turned clockwise causing the gear 47 and the release gear 29 to engage each other. The release gear 29 rotates clockwise. The release pin 29b pushes the movable mirror lock pawl 26 to turn counterclockwise. This disengages the movable mirror 23 from the claw part 26b of the lock pawl 26. The mirror 23 is thus allowed to be turned counterclockwise by the force of the spring 31 until the mirror comes to abut on the camera body 1. The photo-taking system is thus shifted to the WIDE state thereof.

Following this, the control circuit 61 allows the motor 100 to make forward rotation until the on-off signal of the film feeding switch 73 reaches a predetermined amount. At this time, the photo-taking portion of film has been brought to the aperture 1g as shown in FIG. 1. The camera thus becomes ready for a photo-taking operation in the WIDE state thereof.

Further, in this specific embodiment of the invention, the release gear 29 is arranged to make just three turns during the process of bringing the above-stated photo-taking portion of film from the aperture 1f for the TELE state to the aperture 1g for the WIDE state.

In rewinding the film, the camera operates as follows: When known film end detecting means operates, that is, when the counter included in the control circuit 61 detects the fact that the film presence or absence switch 74 is open and the fact that winding of one frame of film has not completed even after a prescribed time longer than the time required for one-frame winding has elapsed, the control circuit 61 changes the rotation of the motor 100 from forward rotation to reverse rotation to have the film thus rewound. In case that the camera is in the WIDE state when the film is rewound, the movable mirror 23 is temporarily charged into the TELE position thereof, respectively when the film 6 is rewound, respectively by the fork. However, this presents no problem for subsequent processes of the camera and also for operations by the photographer.

After that, when the film is wound up into the film cartridge, the film presence-or-absence switch 74 turns on to enable the control circuit 61 to detect completion of film rewinding. Then, the camera winds up one frame portion of film and comes to a stop in a photographing preparation completed state.

During the rewinding operation, the release gear 29 comes to a stop at an intermediate position when the film comes to the end thereof. However, the lever 46 then turns counterclockwise to allow the release gear 29 to be brought by the force of the spring 30 back to its stand-by position as shown in FIG. 3.

Further, when the last film winding action is performed, a clockwise turn of the lever 37 frees the charge cam 42 and the gears 40 and 39. Then, even if the charge lever 43 has been in repose with its pin 43b riding on a lifted portion of the charge cam 42, the cam 42 is turned by the force of the spring 44 and is thus brought back to a stand-by position on the upper half, non-lifting part of the charge cam 42 as viewed on FIG. 5.

Figure 9:
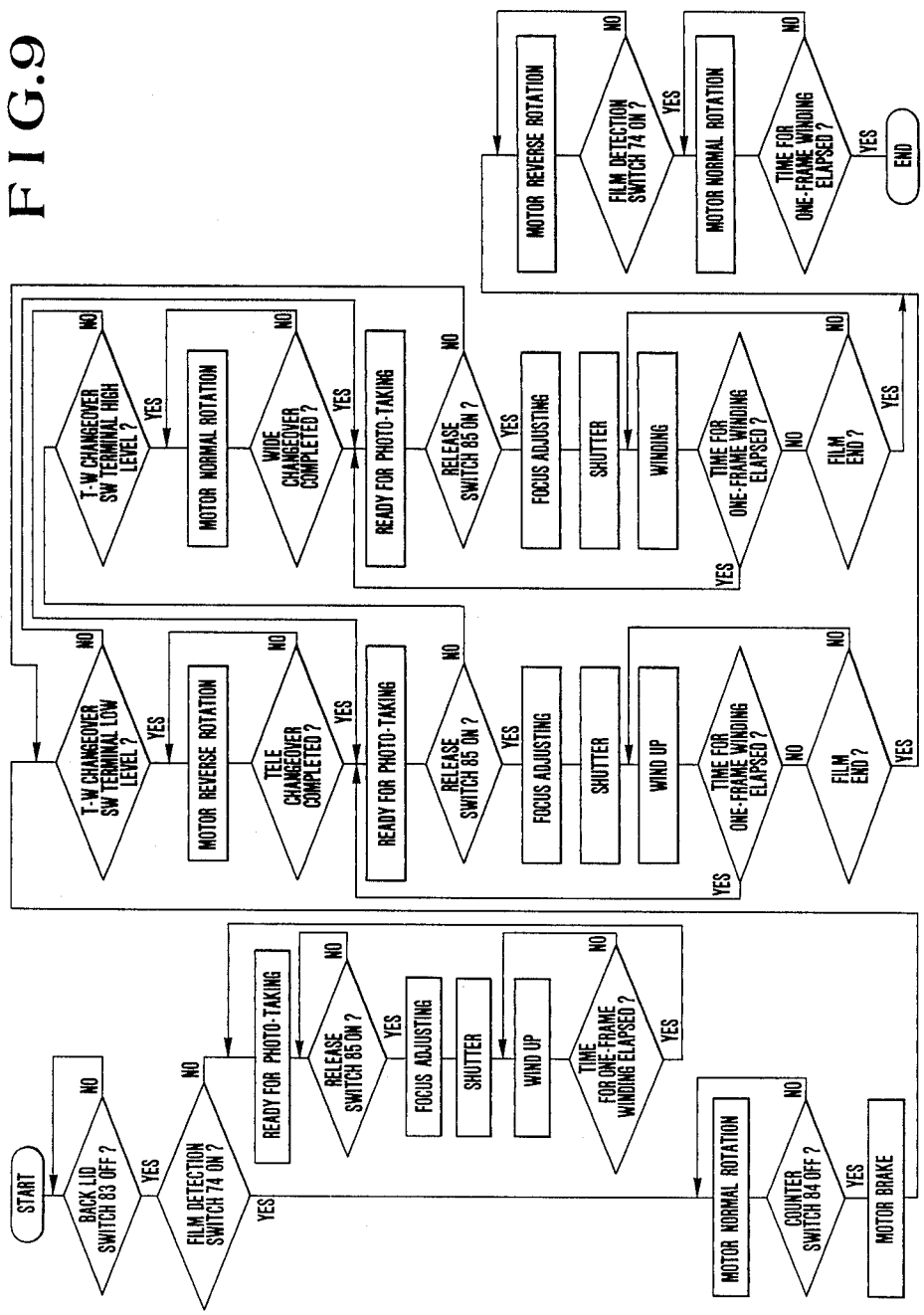
FIG. 9 is a flow chart in a case where a control circuit shown in FIG. 7 is composed of a micro-computer.

Furthermore, in the above circuit arrangement, a flow chart, in a case where the control circuit 61 is composed of a micro-computer, is shown in FIG. 9.

Figure 8A:
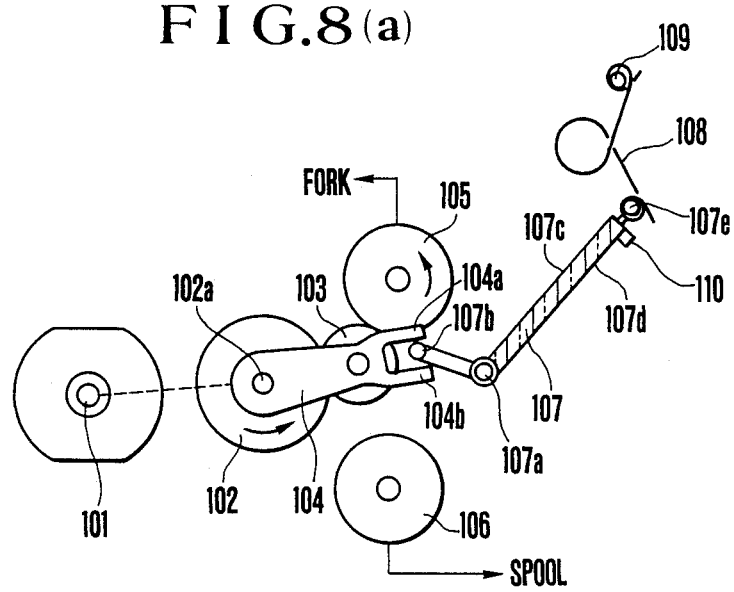
FIG. 8(*a*) shows the arrangement of another example of a mirror driving mechanism shown in FIGS. 1 and 2.
Figure 8B:
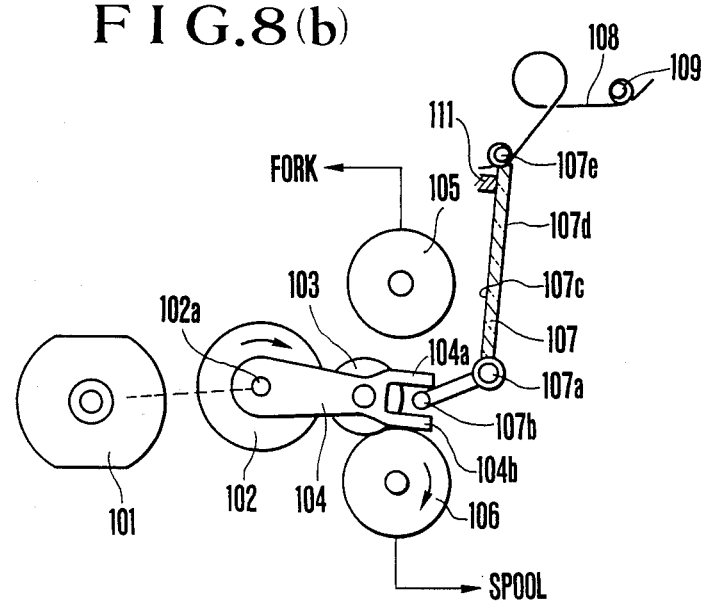

FIGS. 8(a) and 8(b) show the parts of another embodiment of this invention which are interlocked with a film winding device and a photo-taking optical system. These illustrations include a motor 101, which is arranged to be rotatable both in forward and reverse directions by means of motor bridge circuits, and a control circuit which are similar to those employed in the preceding example of embodiment. A sun gear 102 is connected to the shaft of the motor 101 via a reduction gear train which is not shown. The shaft 102a of the sun gear 102 has a lever 104 rotatably fitted thereon. A planetary gear 103 is arranged to engage the sun gear 102 and is fittingly engaged with the lever 104 with a suitable degree of friction. The sun gear 102, the lever 104 and the planetary gear 103 jointly form a known planetary device. The lever 104 is provided with protruding parts 104a and 104b. When the lever 104 turns clockwise on the shaft 102a, the protruding part 104a pushes the pin 107b of a movable mirror 107 and thus shifts the mirror 107 to a position as shown in FIG. 8(b). Conversely, when the lever 104 turns counterclockwise, the other protruding part 104b pushes the pin 107b to the position as shown in FIG. 8(a). A gear 105 is connected to a fork via a gear train which is not shown. When the motor reversely rotates, the sun gear 102 rotates counterclockwise. Then, the planet gear 103 engages the gear 105 as shown in FIG. 8(a) and transmits a driving force to the fork. A gear 106 is connected to a spool via a gear train which is not shown. When the motor forwardly rotates, the sun gear 102 rotates clockwise. The planet gear 103 then engages the gear 106 to transmit the output of the motor 101 to a film take-up spool.

A movable mirror 107 is arranged in a manner similar to the movable mirror 23 of the preceding embodiment and is provided for change-over of a photo-taking optical system between TELE and WIDE positions thereof. The shaft 107a of the mirror 107 is rotatably mounted on a structural member. The above-stated pin 107b, which is arranged to be pushed by the protruding parts 104a and 104b of the lever 104, is provided on one side of the mirror 107. On the other side of the mirror 107 are provided a mirror part 107c and a light shielding coated part 107d. Another pin 107e is disposed at the fore end of the mirror 107 with one end of a toggle spring 108 attached to the pin 107e. The toggle spring 108 is prepared with a torsion spring. The other end of the spring 108 is rotatably attached to a pin 109 disposed on a camera body. Under the conditions as shown in FIGS. 8(a) and 8(b), the force of the toggle spring 108 is exerted in the direction of separating the pins 107e and 109 away from each other. During the process of shifting the position of the movable mirror 107 from the position of FIG. 8(a) to that of FIG. 8(b) or from the position of FIG. 8(b) to that of FIG. 8(a), when the mirror 107 passes an upper dead point located in between these positions, the spring 108 serves as a so-called toggle device for urging it either counterclockwise or clockwise. Structural members 110 and 111 are arranged to serve as positioning parts. Under the conditions as shown in FIGS. 8(a) and 8(b), the toggle spring 108 immovably pushes the movable mirror 107 against these positioning parts 110 and 111.

With the embodiment arranged in this manner, the operation thereof as a camera is briefly described as follows: When the photographer manually operates the operation member of the camera to shift it from the TELE position to the WIDE position thereof, the view finder is shifted in the same manner as in the case of the preceding example. Then, a part of the photo-taking optical system is also retracted. A WIDE switch is closed. The motor 101 is caused to forwardly rotate. The lever 104 is moved clockwise to shift the movable mirror 107 to its WIDE position. After that, the driving force of the motor 101 is transmitted to the spool. The spool then winds up the film to bring a predetermined photo-taking portion of the film to an aperture position provided for WIDE.

An indexing operation is performed by such known means as an indexing sprocket, a photo coupler, etc. In the event that no index portion of film is obtained within a predetermined period of time (when the camera is not loaded with film), the motor is brought to a stop.

A change-over operation from the state of FIG. 8(b) to the state of FIG. 8(a), i.e. from a WIDE state to a TELE state, is performed as follows: Parts of the view finder and the photo-taking system, respectively, can be shifted by the operation member and then a TELE switch is closed. The control circuit, which is not shown, then causes the motor 101 to reversely rotate. The lever 104 is moved counterclockwise. The position of the movable mirror 107 is shifted to its position as shown in FIG. 8(a). After that, the driving force of the motor is transmitted to the fork. The film is wound up by the fork and is thus brought to an aperture provided for TELE.

As has been described above, in accordance with this invention, the magnification change-over device for a camera comprises an incident optical path for the incidence of the light of an object to be photographed; a first optical path for guiding the object light incident on the incident optical path to a first aperture; a second optical path for guiding the object light incident on the incident optical path to a second aperture; changeover means for selection between the first and second optical paths; and optical means for differentiating the magnification of an image formed through the second aperture from that of an image formed through the first aperture. The arrangement according to this invention obviates the need of shifting the shutter and the automatic focusing unit between TELE and WIDE positions, so that the camera can be compactly arranged. Since the lens barrel part is arranged to be not movable, it excels in dust-proof, water-proof and light shielding capabilities. Since the mirror which is employed as magnification change-over means is arranged to be disposed within a space in between the film cartridge chamber and the spool chamber of the camera, the protruding extent of the camera can be reduced to permit the camera to be arranged in a compact size. The magnification change-over device for a camera according to this invention thus excels in operability and in cost-performance. Further, in accordance with the invention, motor drive means is arranged to displace the optical system, the film, etc. in response to a selecting operation of the change-over means; discriminating means is arranged to detect the presence or absence of the film; and the motor drive means is inhibited from displacing the optical system, the film, etc. in the event of detection of the absence of film by the discriminating means. Therefore, the electric energy of the power source battery can be effectively prevented from being wasted.

What is claimed is:

1. A magnification change-over device for a camera, comprising:
   (a) an incident optical path for the incidence of the light of an object to be photographed;
   (b) a first optical path for guiding the object light incident on said incident optical path to a first aperture;
   (c) a second optical path for guiding said object light on said incident optical path to a second aperture;
   (d) change-over means for selecting one of, said first and second optical paths said change-over means prohibiting the non-selected optical path from operating; and
   (e) optical means for differentiating the magnification of an image formed through said second aperture from that of an image formed through said first aperture.

2. A device according to claim 1, wherein said incident optical path is formed by a single optical path.

3. A device according to claim 1, wherein said first and second optical paths are arranged to have different optical path lengths.

4. A device according to claim 1, wherein said change-over means includes a reflecting means for changing the travelling direction of said object light.

5. A device according to claim 4, wherein said reflecting means is arranged to be shiftable between an operative position and a nonoperative position.

6. A device according to claim 5, wherein said second optical path is arranged to be selected when said reflecting means is in the operative position.

7. A device according to claim 6 further comprising light blocking means for preventing the object light which is not reflected by said reflecting means from directly reaching said second aperture when said reflecting means is in the operative position thereof.

8. A device according to claim 4, wherein said reflecting means includes a mirror.

9. A device according to claim 4, further comprising adjusting means for adjusting the angle of reflection of said reflecting means.

10. A device according to claim 1, wherein said optical means is arranged to be insertable into and retractable from said incident optical path.

11. A device according to claim 10, further comprising interlocking means for interlocking the inserting and retracting operation of said optical means into and from said incident optical path with the shift of the position of said reflecting means.

12. A device according to claim 1, further comprising driving means for moving the photo-taking image plane of a photosensitive material to a selected aperture position in response to the selecting action of said change-over means.

13. A device according to claim 12, wherein said driving means includes feeding means for film winding and rewinding.

14. A device according to claim 12, further comprising detecting means for detecting whether or not the camera is loaded with said photosensitive material, said detecting means being arranged to render said driving means inoperative when said camera is found to be not loaded with said photosensitive material.

15. A device according to claim 14, further comprising a view finder which changes the image magnification thereof in response to the selecting action of said change-over means, said view finder being arranged to be capable of shifting the image magnification irrespective of the detecting state of said detecting means.

16. A magnification change-over device for a camera, comprising:
   (a) an incident optical path for the incidence of the light of an object to be photographed;
   (b) a first optical path for guiding the object light incident on said incident optical path to a first aperture;
   (c) a second optical path for guiding said object light on said incident optical path to a second aperture;
   (d) change-over means for selecting one of said first and second apertures, said change-over means prohibiting the non-selected aperture from operating; and (e) optical means for differentiating the magnification of an image formed through said second aperture from that of an image formed through said first aperture.

17. A device according to claim 16, wherein said incident optical path is formed by a single optical path.

18. A device according to claim 16, wherein said first and second optical paths are arranged to have different optical path lengths.

19. A device according to claim 16, wherein said change-over means includes a reflecting means for changing the travelling direction of said object light.

20. A device according to claim 19, wherein said reflecting means is arranged to be shiftable between an operative position and a nonoperative position.

21. A device according to claim 20, wherein said second optical path is arranged to be selected when said reflecting means is in the operative position.

22. A device according to claim 21, further comprising light blocking means for preventing the object light which is not reflected by said reflecting means from directly reaching said second aperture when said reflecting means is in the operative position thereof.

23. A device according to claim 19, wherein said reflecting means includes a mirror.

24. A device according to claim 19, further comprising adjusting means for adjusting the angle of reflection of said reflecting means.

25. A device according to claim 16, wherein said optical means is arranged to be insertable into and retractable from said incident optical path.

26. A device according to claim 25, further comprising interlocking means for interlocking the inserting and retracting operation of said optical means into and from said incident optical path with the shift of the position of said reflecting means.

27. A device according to claim 16, further comprising driving means for moving the photo-taking image plane of a photosensitive material to a selected aperture position in response to the selecting action of said change-over means.

28. A device according to claim 27, wherein said driving means includes feeding means for film winding and rewinding.

29. A device according to claim 27, further comprising detecting means for detecting whether or not the camera is loaded with said photosensitive material, said detecting means being arranged to render said driving means inoperative when said camera is found to be not loaded with said photosensitive material.

30. A device according to claim 29, further comprising a view finder which changes the image magnification thereof in response to the selecting action of said change-over means, said view finder being arranged to be capable of shifting the image magnification irrespective of the detecting state of said detecting means.

31. A camera, comprising a magnification change-over device comprising:

(a) an incident optical path for the incidence of the light of an object to be photographed;

(b) a first optical path for guiding the object light incident on said incident optical path to a first aperture;

(c) a second optical path for guiding said object light on said incident optical path to a second aperture;

(d) change-over means for selecting one of said first and second optical paths, said change-over means prohibiting the non-selected optical path from operating; and (e) optical means for differentiating the magnification of an image formed through said second aperture from that of an image formed through said first aperture.

32. A device according to claim 31, wherein said incident optical path is formed by a single optical path.

33. A device according to claim 31, wherein said first and second optical paths are arranged to have different optical path lengths.

34. A device according to claim 31, wherein said change-over means includes a reflecting means for changing the travelling direction of said object light.

35. A device according to claim 34, wherein said reflecting means is arranged to be shiftable between an operative position and a nonoperative position.

36. A device according to claim 35, wherein said second optical path is arranged to be selected when said reflecting means is in the operative position.

37. A device according to claim 36, further comprising light blocking means for preventing the object light which is not reflected by said reflecting means from directly reaching said second aperture when said reflecting means is in the operative position thereof.

38. A device according to claim 34, wherein said reflecting means includes a mirror.

39. A device according to claim 34, further comprising adjusting means for adjusting the angle of reflection of said reflecting means.

40. A device according to claim 31, wherein said optical means is arranged to be insertable into and retractable from said incident optical path.

41. A device according to claim 40, further comprising interlocking means for interlocking the inserting and retracting operation of said optical means into and from said incident optical path with the shift of the position of said reflecting means.

42. A device according to claim 31, further comprising driving means for moving the photo-taking image plane of a photosensitive material to a selected aperture position in response to the selecting action of said change-over means.

43. A device according to claim 42, wherein said driving means includes feeding means for film winding and rewinding.

44. A device according to claim 42, further comprising detecting means for detecting whether or not the camera is loaded with said photosensitive material, said detecting means being arranged to render said driving means inoperative when said camera is found to be not loaded with said photosensitive material.

45. A device according to claim 44, further comprising a view finder which changes the image magnification thereof in response to the selecting action of said change-over means, said view finder being arranged to be capable of shifting the image magnification irrespective of the detecting state of said detecting means.

* * * * *

UNITED STATES PATENT AND TRADEMARK OFFICE
CERTIFICATE OF CORRECTION

PATENT NO. : 4,862,202

DATED : August 29, 1989

INVENTOR(S) : TAKAHUKI TSUBOI ET AL.

It is certified that error appears in the above-identified patent and that said Letters Patent is hereby corrected as shown below:

Please add the following new claims:

-- 46. A camera, comprising a magnification change-over device comprising:

a) an incident optical path for the incidence of the light of an object to be photographed;

b) a first optical path for guiding the object light incident on said incident optical path to a first aperture;

c) a second optical path for guiding said object light on said incident optical path to a second aperture;

d) change-over means for selecting one of said first and second apertures, said change-over means prohibiting the non-selected aperture from operating; and e) optical means for differentiating the magnification of an image formed through said second aperture from that of an image formed through said first aperture.

UNITED STATES PATENT AND TRADEMARK OFFICE
CERTIFICATE OF CORRECTION

PATENT NO. : 4,862,202

DATED : August 29, 1989

INVENTOR(S) : TAKAHUKI TSUBOI ET AL.

It is certified that error appears in the above-identified patent and that said Letters Patent is hereby corrected as shown below:

47. A device according to claim 46, wherein said incident optical path is formed by a single optical path.

48. A device according to claim 46, wherein said first and second optical paths are arranged to have different optical path lengths.

49. A device according to claim 46, wherein said change-over means includes a reflecting means for changing the travelling direction of said object light.

50. A device according to claim 49, wherein said reflecting means is arranged to be shiftable between an operative position and a nonoperative position.

51. A device according to claim 49, wherein said reflecting means includes a mirror.

52. A device according to claim 46, wherein said optical means is arranged to be insertable into and retractable from said incident optical path.

53. A device according to claim 52, further comprising interlocking means for interlocking the inserting and retracting operation of said optical means into and from said incident optical path with the shift of the position of said reflecting means.

UNITED STATES PATENT AND TRADEMARK OFFICE
CERTIFICATE OF CORRECTION

PATENT NO. : 4,862,202

DATED : August 29, 1989

INVENTOR(S) : TAKAHUKI TSUBOI ET AL.

It is certified that error appears in the above-identified patent and that said Letters Patent is hereby corrected as shown below:

54. A device according to claim 50, wherein said second optical path is arranged to be selected when said reflecting means is in the operative position.

55. A device according to claim 54, further comprising light blocking means for preventing the object light which is not reflected by said reflecting means from directly reaching said second aperture when said reflecting means is in the operative position thereof.

56. A device according to claim 49, further comprising adjusting means for adjusting the angle of reflection of said reflecting means.

57. A device according to claim 46, further comprising driving means for moving the photo-taking image plane of a photosensitive material to a selected aperture position in response to the selecting action of said change-over means.

58. A device according to claim 57, wherein said driving means includes feeding means for film winding and rewinding.

59. A device according to claim 57, further comprising detecting means for detecting whether or not the camera is loaded with said photosensitive material, said detecting means being arranged to render said

UNITED STATES PATENT AND TRADEMARK OFFICE
CERTIFICATE OF CORRECTION

PATENT NO. : 4,862,202

DATED : August 29, 1989

INVENTOR(S) : TAKAHUKI TSUBOI ET AL.

It is certified that error appears in the above-identified patent and that said Letters Patent is hereby corrected as shown below:

driving means inoperative when said camera is found to be not loaded with said photosensitive material.

60. A device according to claim 59, further comprising a view finder which changes the image magnification thereof in response to the selecting action of said change-over means, said view finder being arranged to be capable of shifting the image magnification irrespective of the detecting state of said detecting means. --.

Signed and Sealed this

Tenth Day of September, 1991

Attest:

HARRY F. MANBECK, JR.

Attesting Officer     Commissioner of Patents and Trademarks